United States Patent [19]

Sanborn et al.

[11] Patent Number: 5,514,450
[45] Date of Patent: May 7, 1996

[54] AMINOSILANES FOR NON-BLEED AQUEOUS CORRECTION FLUID

[76] Inventors: Kay C. Sanborn, 440 Oreland Mill Rd., Oreland, Pa. 19075; Linda S. Smith, 3512 Wischman Ave., Oreland, Pa. 19075

[21] Appl. No.: 276,970

[22] Filed: Jul. 19, 1994

Related U.S. Application Data

[62] Division of Ser. No. 132,620, Oct. 6, 1993, Pat. No. 5,370,922.

[51] Int. Cl.$^6$ ........................................ B32B 27/00
[52] U.S. Cl. .................. 428/204; 428/205; 428/201; 524/506; 524/556
[58] Field of Search ............................ 525/102, 100; 524/506, 556; 428/447, 511, 201, 203, 204, 205; 106/19 A, 19 F

[56] References Cited

U.S. PATENT DOCUMENTS

| | | | |
|---|---|---|---|
| 3,736,283 | 5/1973 | Taylor | 525/102 |
| 4,486,565 | 12/1984 | Benjamin | 524/506 |
| 4,732,614 | 3/1988 | Brooks et al. | 106/21 |
| 5,051,283 | 9/1991 | Beane et al. | 427/440 |
| 5,256,191 | 10/1993 | Thompson et al. | 106/19 |

FOREIGN PATENT DOCUMENTS

| | | |
|---|---|---|
| 56-125403 | 10/1981 | Japan . |
| 364305 | 3/1991 | Japan . |
| 618462 | 7/1980 | Switzerland . |
| 9207039 | 10/1990 | WIPO . |
| 9214788 | 9/1992 | WIPO . |

*Primary Examiner*—Ralph H. Dean
*Attorney, Agent, or Firm*—Sudhir G. Deshmukh

[57] ABSTRACT

This invention relates to an aqueous correcting fluid, the use of which prevents bleeding of aqueous ink dyes during correction of writing errors or erasure of documents using white out. This is accomplished according to the present invention by the fact that the correcting fluid contains an anionic or non-ionic active binder plus an aminosilanes.

The aminosilane-modified correcting fluid of this invention may be substituted for solvent-based fluids, without adversely affecting other properties such as water resistance, opacity and curing.

2 Claims, No Drawings

AMINOSILANES FOR NON-BLEED AQUEOUS CORRECTION FLUID

This is a divisional of Ser. No. 08/132,620 filed on Oct. 6, 1993, which was granted on Dec. 6, 1998 having a U.S. Pat. No. 5,370,922.

FIELD OF THE INVENTION

This invention relates to an aqueous correction fluid, the use of which prevents bleeding of aqueous ink dyes during correction of writing errors or erasures of documents using correction fluids that are also known as white-out. This is accomplished according to the present invention by the fact that the correcting fluid contains an active polymeric binder plus an aminosilane.

The aminosilane-modified correction fluid of this invention may be substituted for solvent-based fluids, without adversely affecting other properties, such as water resistance, opacity and curing.

BACKGROUND OF THE INVENTION

Correction fluids used for whiting out writing errors are known. They are typically applied, for example, by means of a brush which is attached to the screw cap of the container. In addition to having pigments and fillers such as clay, the correcting fluid also contains a polymeric binder and dispersant to anchor the pigments on the paper, as well as a dispersant medium or solvent to maintain the viscosity of the correcting fluid. The solvents are generally volatile organic solvents such as hydrocarbons or chlorinated products of hydrocarbons.

Correction fluids suffer at least two shortcomings; they are environmentally unfriendly, and they allow aqueous ink dyes to bleed through, or into, the applied correcting fluid. Bleeding means that the white correcting layer assumes a bluish or reddish tint or other type of blemish color due to the ink dye penetrating the surface being corrected. While aqueous based correcting fluids minimize the environmental concerns, they have not found wide acceptance as substitutes for solvent-based correcting. Water-soluble ink dyes present in fiber markers and felt tip pens dissolve in aqueous correcting fluid and penetrate and bleed into the surface at the point where the correction fluid was applied. What is required is a non-bleeding correcting fluid that is effective in covering writing errors without the use of volatile organic solvents, while other properties, such as water resistance, opacity and curing of the applied correcting fluid is maintained.

What has been found to be novel and unanticipated is an aminosilane-modified composition, the use of which prevents solvent-based and aqueous-based ink dyes from bleeding into or through the correcting layer.

There are several advantages of the non-bleeding system of the present invention: first, it prevents water-soluble ink dyes in fiber markers and felt tip pens from bleeding into the correcting fluid; second, it maintains properties, such as water resistance, opacity and curing of the applied correcting fluid; third, it provides a water-based correcting system that is equivalent in performance to solvent-based correcting fluids; and finally, it provides a water-based correction fluid which is generally solvent-free and contains low levels of VOCs (Volatile Organic Compounds) when compared to solvent-based systems.

PRIOR RELATED ART

Although other systems for preventing bleeding of correcting fluids used to white out writing errors are known, none use or suggest the use of an aminosilane-modified polymer as an effective blocking agent. For example, German Pat. No. W0 92/07039 discloses a correcting fluid capable of preventing bleeding which contains water or a mixture of water and volatile organic water-miscible solvents as suspension medium, a cationically active film-forming binder to fix the dyes in the area to be corrected.

U.S. Pat. No. 5,051,283 discloses a surface treating composition for wooden surfaces that inhibits leachable compositions from staining after-applied water-base coating comprising about 1 (one) to about 25 percent by weight of an alkali metal salt of a monobasic or dibasic carboxylic acid and about 1 (one) to about 50 percent by weight of a water-soluble organic compound bearing one or more salt-forming amine groups and having a molecular weight of about 50 to about 300,000 and from about 25 percent to about 98 percent water.

International Application Number PCT/US/92100643 discloses a polymeric composition containing at least one acid-functional vinyl polymer and at least one amino-functional siloxane polymer. The blended polymeric compositions are able to provide various substrates with surface coatings that are characterized as quasi-crosslinked, alkali-soluble polymeric networks exhibiting enhanced surface properties. Also disclosed are methods of producing the blended polymeric composition.

Japanese Patent Application J 03-064305A discloses a composition consisting of a carboxyl group-containing water-soluble resin, macromolecular aqueous dispersion and water-soluble silane coupling agent containing an amino group in the molecule in which the carboxyl group-containing water soluble resin has an acid value of 30–800 and the amounts per 100 solid weight parts of the macromolecular aqueous dispersion of 0.2–2.0 weight parts of the aqueous resin and 0.1–3 weight parts of the amino group-containing silane coupling agent are compounded.

SUMMARY OF INVENTION

In one aspect of the present invention is provided a composition capable of preventing the bleeding of aqueous ink dyes into correcting fluids comprising an acid-functional vinyl polymer having an acid level from about 0.1 percent to about 99.9 percent, modified with from about 0.1 percent to about 99.9 percent by weight of an aminosilane having one or more amine groups and having a molecular weight of from about 100 to about 10,000.

In another aspect of the present invention is provided a method for preventing the bleeding of aqueous ink dyes into correcting fluids which comprises applying over a paper substrate containing writing errors a blend of an acid-functional polymer having an acid level from about 0.1 percent to about 99.9 percent, and from about 0.1 percent to about 99.9 percent by weight of an amino-functional silane based on the weight of the polymer.

DETAILED DESCRIPTION OF THE INVENTION

This invention relates to an aqueous correcting fluid, the use of which prevents bleeding of aqueous ink dyes during correction of writing errors or erasures of documents using white out or white correction type fluids. This is accomplished, according to the present invention, by the fact that the correction fluid contains an effective amount of an anionic or non-ionic active polymeric binder plus an aminosilane.

The aminosilane-modified correcting fluid of this invention may be substituted for solvent-based fluids, while other properties, such as water resistance, opacity and curing are not adversely effected.

What has been found to be novel and unexpected is a correcting fluid and a method for using the same for preventing the bleeding of aqueous based ink dyes into correcting fluids that are used to cover writing errors on paper substrates which is characterized by a correcting fluid comprising an acid-functional vinyl polymer having an acid level from about 0.1 percent to about 99.9 percent, modified with from about 0.1 percent to about 99.9 percent by weight of an aminosilane having one or more amine groups having a molecular weight of from about 100 to about 10,000.

Another aspect of the present invention is that it provides a method for preventing the bleeding of aqueous ink dyes into correction fluids applied over writing errors on paper substrates which comprises applying to the paper substrate a blend of an acid-functional polymer having an acid level from about 0.1 .percent to about 99.9 percent, and from about 0.1 percent to about 99.9 percent by weight of an amino silane, having one or more amine groups and having a molecular weight of from about 100 to about 10,000.

The Acid Functional Polymer

The water-based emulsion polymer to be modified with the aminosilane, in accordance with the present invention, can be prepared via any processes known in the art. Monomers useful in the preparation of the emulsion polymers consist wholly or largely of monomers which do not contain any reactive groups other than the ethylenic unsaturation. Examples of monomers useful in the polymerization of the acid-functional polymer may be selected from the group consisting of alkyl(meth)acrylates, styrene and vinyl esters of carboxylic acids such as hydroxyethyl acrylate, hydroxyethyl methacrylate, hydroxypropyl methacrylate, ethylene glycol-monoallylether, glycidyl acrylate, glycidyl methacrylate, allyl glycidyl ether, and the like.

In the polymerization process of the present invention, it is also possible to use monomers in relatively small amounts such as, for example, between 0.1 and 10 percent by weight, which, in addition to the ethylenic unsaturation, may also contain other reactive groups selected from the group consisting of hydroxyl groups, alkoxymethyl amide groups, such as, for example, N-methlolacrylamide, N-methylolmethacrylamide, n-butoxymethyl acrylamide, n-butoxymethyl methacrylamide, or epoxy groups, and the like.

Acid-functionality is usually, but not in all instances, limited to the use of acid-functional monomers, such as, for example, acrylic acid, methacrylic acid fumaric acid, maleic acid, crotonic acid, itaconic acid, phosphoric acid esters of hydroxyethyl-(meth)-acrylate acrylamidopropansulphonic acid, and vinylsulphonic acid. Preferably, acrylic acid and/or methacrylic acid and itaconic acid and or phosphoethyl methacrylate are used as monomer units containing acid groups in the practice of this invention.

Also useful in the preparation of emulsion polymers of the present invention, in amounts from about 1 percent up to about 10 percent by weight, are alkylenically polyunsaturated monomers, such as triallyl cyanurate, divinyl maleate, divinyl adipate, vinylcrotonate and ethylene glycol diacrylate ester, allylmethacrylate, and the like.

Various initiator systems for the polymerization of the olefinically unsaturated monomers of the present invention may be used. Examples of suitable types of initiators are selected from the group consisting of persulphates, hydrogen peroxides, organic peroxides, such as hydroperoxides and azo compounds, either individually as single a initiator system or in combination with reductants. Depending on the nature of the monomers and on the desired properties of the polymer and on the desired size of the polymer particles, various kinds of emulsifiers can be used either separately or in combination. Generally, both anionic and non-ionic emulsifiers can be used. Optionally, protective colloids can also be used. In many cases, a mixture of an anionic and a non-ionic emulsifier is the most satisfactory. A few examples of suitable classes of compounds available for use in the polymerization are alkylbenzenesulphonates and alkyl ($C_{10}$–$C_{18}$) sulfates, mono-diakylphosphates, ($C_{10}$–$C_{18}$) fatty acid salts, polyglycolethers of ($C_8$–$C_{18}$) alcohols or alkylphenols and block copolymers of ethylene oxide and propylene oxide.

An emulsifier or combination of emulsifiers may be used in the polymerization process. The amount used depends on the type of monomer and on the type of emulsifier. Generally, an amount form about 0.1 to about 10 percent by weight is used, more specifically an amount form about 0.5 to about 5 percent by weight, based on the total amount of solid.

The polymerization can also be affected by first producing a pre-emulsion of the monomers and a part of the total amount of water and emulsifiers and subsequently starting the polymerization with the aid of a initiator whereas the metering time of the pre-emulsion and the initiator is between 2 and about 5 hours. On the other hand, it is possible to first polymerize part of the monomers in emulsion and to add more monomers stepwise, separately or mixed. In addition, it is possible to first polymerize a monomer or a combination of monomers of a certain type, and to subsequently add other monomers or combinations of monomers, so that polymer particles with a laminated structure are formed. This type of structure is sometimes referred to as core-shell or sheath polymers. The concentration of acid groups can be different for each layer, for instance, with a high concentration of acid groups on the outside of the particle and a low concentration in the center of the particle. The amount of acid required may then be less than 2.0 percent by weight, for example, between 0.5 and 1.0 percent by weight, based on the total polymer. A further explanation and description of the process for producing core-shell polymers is contained in U.S. Pat. No. 4,916,171, and is, by this reference, incorporated herein.

The polymerization can also be affected by polymerization of polymer particles of different sizes, where several distinct maxima in the particle size distribution create a polymodal dispersion and where two such distinct maxima in the particle size distribution curve indicate bimodal dispersions. The preparation of bimodal dispersion is further described in U.S. Pat. No. 4,384,056 and is, by this reference, incorporated herein. A further explanation and description of the process for producing polymodal dispersions is contained in U.S. Pat. No. 4,539,361, and is, by this reference, incorporated herein.

The reaction temperature during the polymerization may be between minus (–) 15 degrees centigrade and 100 degrees centigrade, preferably the polymerization is carried out ideally between 20 degrees centigrade and 90 degrees centigrade.

During the polymerization, other compounds may also be present; for instance, molecular weight regulators or chain transfer agents, such as mercaptans, and buffers, such as sodium bicarbonate. In addition, substances like plasticizers, crosslinking agents, flow-promoting agents, thickeners, colorants or pigments, including inorganic and polymeric pigments, may be present during the polymerization or be added after the polymerization. Also, adhesion promoting monomers, such as disclosed and prepared in accordance with U.S. Pat. Nos. 2,980,652, 4,599,417 and 4,777,265, and are, by this reference, incorporated herein, may be present during polymerization of the acid-functional polymer.

When emulsion polymers are polymerized using surfactants, such as for example, sodium lauryl sulfate, and the like, it may be necessary to add additional surfactant to allow for the incorporation of the aminosilane in order to provide stability to the modified acid-functional polymer. The level of surfactant used, if required, is from about 0.1 percent to about 10 percent by weight, based on the weight of the emulsion polymer.

Aminosilanes

In the aqueous-based system of the present invention, the excessive reactivity of aminosilanes is exploited. It is believed that the combination of the reactive aminosilane with an acid-functional vinyl polymer creates a correcting fluid that effectively fixes the aqueous based ink dyes and prevents them from migrating into white out-type correction fluids. However, this is only a theory of what we believe happens in the present invention and should not be considered in any way whatsoever to limit the scope of such, which is more specifically defined in the claims.

The aminosilane-modified correcting fluids of this invention are prepared by adding an effective amount of an aminosilane to an acid-functional polymer. The quantity of aminosilane that is added to the polymer is a function of the acid content of the acid-functional polymer. When the acid level of the acid-functional polymer is sufficient to be called an alkali-soluble type resin, the acid content is from about 10 weight percent to about 100 weight percent, based on the weight of the polymer. Preferably, the acid level in the acid-functional soluble resin is from about 15 percent to about 50 percent, more preferably, from about 15 percent to about 25 percent.

The level of aminosilane to modify the acid-functional or alkali-soluble polymer is from about 10 percent to about 100 percent. The preferred level of aminosilane to modify the acid-functional polymer soluble resin is from about 15 percent to about 50 percent, more preferably, from about 15 percent to about 25 percent, based on the weight of the polymer.

When the acid level of the acid-functional polymer is a core-shell type resin, and the acid content of the core shell is from about 0.5 weight percent to about 50 weight percent, based on the weight of the weight of the total polymer, then the preferred acid level in the acid-functional core shell resin is from about 0.5 percent to about 30 percent, more preferably, from about 0.5 percent to about 30 percent.

The level of aminosilane to modify the acid-functional core shell polymer is from about 0.5 percent to about 50 percent. The preferred level of aminosilane to modify the acid-functional core shell polymer is from about 0.5 percent to about 30 percent, more preferably, from about 0.5 percent to about 25 percent, based on the weight of the polymer.

When the acid level of the acid-functional emulsion polymers is, such as, for example, bimodal, unimodal, or multilobe type morphology, the acid content of the emulsion is from about 0.5 weight percent to about 20 weight percent, based on the weight of the polymer. Preferably, the acid level in the acid-functional bimodal type polymer is from about 0.5 percent to about 10 percent, more preferably from about 0.5 percent to about 5 percent. The level of aminosilane to modify the acid-functional emulsion polymer is from about 0.5 percent to about 20 percent. The preferred level of aminosilane to modify the acid-functional bimodal polymer is from about 0.5 percent to about 10 percent, more preferably from about 0.5 percent to about 5 percent, based on the weight of the polymer.

If insufficient aminosilane is used in relation to the acid-functional vinyl polymer, properties such as, for example, water resistance of the dried correction fluid can be compromised, and the prevention of bleeding may not be optimized or adversely effected. Whereas, on the other hand, if too high a level of aminosilane is used in relation to the acid-functional vinyl polymer to achieve effective bleeding prevention, the excess aminosilane may adversely effect the vinyl coating's properties, such as, for example, opacity and curing of the correction fluid.

Aminosilanes of various molecular weights may be used to modify the acid-functional vinyl polymer in the practice of this invention. Preferably, however, the aminosilanes have a number average molecular weight, as may be determine by gel permeation chromatography, of from about 100,to about 10,000, more preferably from about 150 to about 5000. Practical considerations, such as solubility, mechanical application, and the like, are generally the only limitations upon the aminosilane's molecular weight. Although for convenience purposes, it is most preferred that the molecular weight does not exceed a maximum of about 1000.

In general, aminosilanes are organic materials containing silicone. Aminosilanes found to be effective modifiers of acid-functional polymers for prevention of bleeding of aqueous-based and solvent-based ink dyes in unpigmented correction fluids may be selected from the group consisting of trimethoxysilylpropyldiethylenetriamine, N-methylaminopropyltrimethoxysilane aminoethylaminopropylmethyldimethoxysilane, aminoethylaminopropyltrimethoxysilane (Dow Corning Z-6020), aminopropylmethyldimethoxysilane, aminopropyltrimethoxysilane, polymeric aminoalkylsilicone, aminoethylaminoethylaminopropyltrimethoxysilane, N-methylaminopropyltrimethoxysilane, methylaminopropyltrimethoxysilane, and the like, are available from Dow Corning, Midland, Mich., Union Carbide Specialty Chemicals Division, Danbury Conn. and Huls of America, Piscataway, N.J.

Additionally, other silanes that may be capable of preventing bleeding of correction fluid when employed as modifiers for acid-functional polymers, include quaternary aminosilanes, epoxy silanes, and the like. Still other silanes include mercaptosilanes, vinylsilanes, methacryloxysilanes, and the like.

In the practice of the invention, aminosilane-modified correction fluids are prepared by adding a specific quantity of aminosilane to an acid-containing vinyl polymer. The technique for adding the aminosilane may be by any known in the art, e.g., stirring, shaking, mechanical mixing, and the like. The quantity of silane added should be in specific proportion, for reasons stated earlier, to the acid content of the polymer. However, in the practice of the present invention, the amino-functional silane is preferably added after the polymerization of the emulsion vinyl polymer. The amino-functional silane may, however, also be added during the polymerization, if desired. Again, if the aminosilane is used in quantities which are not relative to the acid-functional polymer, physical properties of the correcting fluid may be adversely affected, including bleeding prevention.

The following non-limiting examples are provided to further illustrate the aminosilane-modified correction fluid prepared according to the present invention. These examples are intended to be illustrative of the present invention and are in no way intended to limit the scope of such except as further delineated in the claims.

TEST METHODS

Ink dyes are small discrete molecules that migrate to the surface of correction fluids at the point where the correction fluid is applied. This migration and subsequent penetration and discoloration of the surface of the correcting fluid is called "bleeding".

What we found to be effective in blocking or fixing the ink dyes of typical water-based marking pens and preventing bleeding of the ink dyes into the correcting fluid is a water-based correcting fluid based on an amino silane modified polymer.

To demonstrate the utility of this invention, the following method was used:

1. Pen markings (problem pens outlined below) were applied over white, regular bond paper.
   Pilot Razor Point (blue/black)—Anionic
   Pentel Rolling Writer (green)—Anionic
   Uniball (blue)—Anionic
   Paper mate Metal Roller (blue)—Anionic
   Express (black)—Cationic
2. Using a brush applicator, both clear, unpigmented formulations and pigmented control formulations were applied over the inked paper.
3. The dried films were examined for bleeding, smearing and surface color change.
4. Pigmented formulations were reapplied over the first pigmented coat.
5. Dried films were re-examined for smearing/bleeding and coverage/ opacity.

Calculation of Results

Ink bleed was measured by rating the amount of smearing, 1 to 10, with a 10 being very poor smearing and bleeding, and 1 indicating that the dye has been fixed or blocked with no bleeding or smearing.

Coverage of the correcting surface is also rated with a 1 to 10 rating. A 1 rating is indicative of complete coverage after 1 pass; a 4 is complete coverage after 2 passes; and a 10 is no coverage after 2 passes. A 1 to 5 rating is considered acceptable.

Samples of the clear formulations were prepared by as follows:

1. Pour a given amount of the polymer into a plastic container and place on a lab mixer.
2. Add a given amount of Triton X-405 (nonionic surfactant) to the polymer and allow to mix thoroughly.
3. Add a given amount of Z-6020 (Aminosilane compound) to the mixture and allow for thorough mixing.
4. Allow sample to equilibrate overnight before testing.

EXAMPLE 1

Dye Stain Blocking or Fixing of Unpigmented, Clearcoats

An unpigmented emulsion sample was modified with various amounts of Z-6020 (aminoethylaminopropyl trimethoxysilane) and tested for ink bleed. The emulsion composition is 52.3 BA/46.8 MMA/1.3 AA/zero (0) to 5 percent adhesion promoter where adhesion promoter is substituted for some combination of the monomers and the morphology is a bimodal particle size distribution.

See Table 1(a) for the formulation and Table 1 (b) for the results of the testing.

TABLE 1(a)

| ID | Polymer | Triton X-405 | Z-6020 |
|---|---|---|---|
| A | 100 grams | — | — |
| B | 100 grams | 1.23 grams | 1.23 grams |
| C | 100 grams | 1.23 grams | 2.46 grams |

To prepare the formulation, Triton X-405 was added to the polymer under agitation prior to the addition of Z-6020.

TABLE 1(b)

| | | Ink Bleed Rating over | | | | | |
|---|---|---|---|---|---|---|---|
| Sample | Description | Pilot Black | Pilot Blue | Pentel Green | Express Black | Uniball Blue | Paper Mate Blue |
| A | Control | 9 | 9 | 9 | 9 | 9 | 9 |
| B | 2% Z-6020 | 2 | 2 | 4 | 2 | 2 | 2 |
| C | 4% Z-6020 | 1 | 1* | 2 | 1 | 1* | 1* |

*Color change from blue to violet was noted.

The addition of Z-6020 improved the ink bleed.

EXAMPLE 2

Dye Stain Blocking of Unpigmented Clearcoats

An unpigmented emulsion was modified with various amounts of Z-6020 and tested for ink bleed. The emulsion composition is 50/50 blend of a 51.9 BA/46.8 MMA/1.3 AA latex with a 51 BA/46.9 MMA/1.3 AA/zero (0) to 5 percent adhesion promoter where adhesion promoter is substituted for some combination of the monomers and the morphology is a multi lobe particle size polymer.

TABLE 2(a)

| ID | Polymer | Triton X-405 | Z-6020 |
|---|---|---|---|
| D | 100 grams | — | — |
| E | 100 grams | 1.10 gms | 0.55 gms |
| F | 100 grams | 1.10 gms | 1.10 gms |
| G | 100 grams | 1.10 gms | 1.60 gms |

The same formulation procedure as described in Example 1 was used for Example 2.

TABLE 2(b)

| | | Ink Bleed Rating over | | | | | |
|---|---|---|---|---|---|---|---|
| Sample | Description | Pilot Black | Pilot Blue | Pentel Green | Express Black | Uniball Blue | Paper Mate Blue |
| D | Control | 7 | 7 | 7 | 2 | 6 | 6 |
| E | 1% Z-6020 | 5 | 5 | 7 | 2 | 6 | 4 |
| F | 2% Z-6020 | 6 | 6 | 7 | 2 | 5 | 5* |
| G | 3% Z-6020 | 2 | 4 | 6 | 1 | 4 | 3* |

The addition of Z-6020 improved the ink bleed.

EXAMPLE 3

Dye Stain Blocking of Unpigmented, Clearcoats

An unpigmented emulsion sample was modified with various amounts of Z-6020 and tested for ink bleed. The emulsion composition is 34.5 EHA/55 MMA/2.5 ST/8 MAA/.57 nDDM.

See Table 3(a) for the formulation and Table 3(b) for the results of our testing.

TABLE 3(a)

| ID | Polymer | Triton X-405 | Z-6020 |
|---|---|---|---|
| H | 100 grams | — | — |
| I | 100 grams | 0.8 grams | 1.6 grams |
| J | 100 grams | 1.0 grams | 3.3 grams |

The same formulation procedure as described in Example 1 was used for Example 3.

TABLE 3(b)

| | | Ink Bleed Rating over | | | | | |
|---|---|---|---|---|---|---|---|
| Sample | Description | Pilot Black | Pilot Blue | Pentel Green | Express Black | Uniball Blue | Paper Mate Blue |
| H | Control 0% | 8 | 8 | 8 | 8 | 8 | 8 |
| I | 4.3% Z-6020 | 5 | 5 | 6 | 2 | 4 | 6 |
| J | 8.9% Z-6020 | 5 | 5 | 6 | 2 | 4 | 6 |

The addition of Z-6020 improved the ink bleed.

EXAMPLE 4

Dye Stain Blocking of Unpigmented, Clearcoats

An unpigmented alkali soluble emulsion sample was modified with various amounts of Z-6020 (aminoethylaminopropyl trimethoxysilane) and tested for ink bleed. The emulsion composition is (80 EA/20 MMA 1.95% nDDM, MW~40-50K)

See Table 4(a) for formulations and Table 4(b) for results of testing.

TABLE 4(a)

| ID | Polymer | Triton X-405 | Z-6020 |
|---|---|---|---|
| K | 100 grams | — | — |
| L | 100 grams | 1.1 grams | 5.0 grams |
| M | 100 grams | 1.1 grams | 8.3 grams |

The same formulation procedure as described in Example 1 was used for Example 4.

TABLE (b)

| | | Ink Bleed Rating over | | | | | |
|---|---|---|---|---|---|---|---|
| Sample | Description | Pilot Black | Pilot Blue | Pentel Green | Express Black | Uniball Blue | Paper Mate Blue |
| K | Control 0% | 8 | 8 | 8 | 8 | 8 | 8 |
| L | 20% Z-6020 | 2 | 2 | 4 | 1 | 2 | 1 |
| M | 33.2% Z-6020 | 2 | 2 | 3 | 1 | 2* | 1* |

TABLE (b)-continued

| | | Ink Bleed Rating over | | | | |
|---|---|---|---|---|---|---|
| Sample | Description | Pilot Black | Pilot Blue | Pentel Green | Express Black | Uniball Blue | Paper Mate Blue |

*Color change from blue to violet was noted.

The addition of Z-6020 improved the ink bleed.

EXAMPLE 5

Dye Stain Blocking of Unpigmented, Clearcoats

An unpigmented alkali soluble emulsion sample was modified with various amounts of Z-6020 (aminoethylaminopropyl trimethoxysilane) and tested for ink bleed. The emulsion composition is (53 EA/26 MMA/3 CST/18 MAA/ 0.7 MMP, MW-50-60K).

See Table 5(a) for the formulation and Table 5(b.) for the results of the testing.

TABLE 5(a)

| ID | Polymer | Triton X-405 | Z-6020 |
|---|---|---|---|
| N | 100 grams | — | — |
| O | 100 grams | 1.2 grams | 3.3 grams |
| P | 100 grams | 1.2 grams | 6.6 grams |

The same formulation procedure as described in Example 1 was used for Example 5.

TABLE 5(b)

| | | Ink Bleed Rating over | | | | | |
|---|---|---|---|---|---|---|---|
| Sample | Description | Pilot Black | Pilot Blue | Pentel Green | Express Black | Uniball Blue | Paper Mate Blue |
| N | Control | 8 | 8 | 8 | 8 | 8 | 8 |
| O | 18.3% Z-6020 | 4 | 4 | 5 | 2 | 2 | 4 |
| P | 36.6% Z-6020 | 4 | 4* | 4 | 3 | 3* | 5* |
| Q | Cationic Control Binder | 1 | 1 | 1 | 1 | 1 | 1 |

*Color change from blue to violet was noted.

Cationic Control Polymer is a cationic solution polymer.

The addition of Z-6020 improved ink bleed.

EXAMPLE 6

Dye Stain Blocking with Pigmented Formulations

Several commercial comparative correction fluid formulations were rated for ink bleed and coverage as. See Table 6 for results of the testing.

TABLE 6

| | | Ink Bleed Rating over | | | | | |
|---|---|---|---|---|---|---|---|
| Sample | Description | Pilot Black | Pilot Blue | Pentel Green | Express Black | Uniball Blue | Paper Mate Blue |
| R | LIQUID PAPER | 3/4 | 3/4 | 3/4 | 6 | 2/4 | 2/4 |
| S | JUST FOR COPIES | 9 | 9 | 9 | 9 | 9 | 9 |
| T | TIPP-EX | 2/4 | 2/4 | 2/4 | 3/4 | 2/4 | 2/4 |

TABLE 6-continued

| | Ink Bleed Rating over | | | | | |
|---|---|---|---|---|---|---|
| Sample Description | Pilot Black | Pilot Blue | Pentel Green | Express Black | Uniball Blue | Paper Mate Blue |

LIQUID PAPER is a trademark of The Gillette Company (solvent based).
JUST FOR COPIES is a trademark of The Gillette Company (water based-anionic) and
TIPP-EX is a trademark of Tipp-Ex GmbH & Co (water based-cationic).

The LIQUID PAPER covered the six problem pens that are based on water-soluble dyes and did very well, as did the TIPP-EX. The LIQUID PAPER and JUST FOR COPIES did not cover the pen marking even after multiple passes.

GLOSSARY

BA—Butyl Acrylate
EA—Ethyl Acrylate
MMA—Methyl Methacrylate
MMP—Mercaptomethyl Propianate
AA—Acrylic Acid
EHA—Ethyl hexyl Acrylate
ST—Styrene
nDDM—n Dodecyl mercapton
MW—Molecular Weight

We claim:

1. A paper substrate containing writing errors treated by a correction fluid composition for preventing the bleeding of aqueous ink dyes into correction fluids comprising an acid-functional vinyl polymer having an acid level from 0.1 percent to about 99.9 percent, modified with from about 0.1 percent to about 99.9 percent by weight of an aminosilane having one or more amine groups, said aminosilane having a number average molecular weight of from about 100 to about 10,000.

2. A paper substrate containing writing errors treated by a correction fluid composition for preventing the bleeding of aqueous ink dyes into correction fluids and having improved water resistance, opacity, and curing said composition comprising an acid-functional vinyl polymer having an acid level from 0.1 percent to about 99.9 percent, modified with from about 0.1 percent to about 99.9 percent by weight of an aminosilane having one or more amine groups, said aminosilane having a number average molecular weight of from about 100 to about 10,000.

* * * * *

UNITED STATES PATENT AND TRADEMARK OFFICE
CERTIFICATE OF CORRECTION

PATENT NO : 5,514,450
DATED : May 7, 1996
INVENTOR(S) : Kay Connelly Sanborn et al.

It is certified that error appears in the above-identified patent and that said Letters Patent is hereby corrected as shown below:

```
On title page, item 57 Abstract
  replace "white out"
  with --WITE-OUT®, a registered trademark of the BIC Corporation--.

Col. 1, line 13
  replace "white-out"
  with --WITE-OUT®, a registered trademark of the BIC Corporation--.

Col. 2, line 67
  replace "white out"
  with --WITE-OUT®, a registered trademark of the BIC Corporation--.

Col. 5, line 23
  replace "white-out-"
  with --WITE-OUT®, a registered trademark of the BIC Corporation,--.
```

Signed and Sealed this

Third Day of November, 1998

*Attest:*

BRUCE LEHMAN

*Attesting Officer*      *Commissioner of Patents and Trademarks*